United States Patent [19]
Moses et al.

[11] Patent Number: 5,028,015
[45] Date of Patent: Jul. 2, 1991

[54] GROUND RETAINING DEVICE

[76] Inventors: Charles H. Moses; Betty D. Moses, 1802 Chase Dr., both of Saraland, Ala. 36571

[21] Appl. No.: 540,141

[22] Filed: Jun. 19, 1990

[51] Int. Cl.⁵ .................. B64F 1/04; A63H 27/14
[52] U.S. Cl. .......................... 244/63; 446/34; 446/429
[58] Field of Search ............... 446/34, 63, 429; 244/63

[56] References Cited
U.S. PATENT DOCUMENTS 3,163,380 12/1964 Brodie .................................. 244/63
3,905,350 9/1975 Becker ................................. 446/63

FOREIGN PATENT DOCUMENTS 0703347 2/1965 Canada .............................. 446/429

Primary Examiner—Joseph F. Peters, Jr.
Assistant Examiner—L. L. Palomar

[57] ABSTRACT

A ground retaining device for pilotless, radio controlled, miniature model airplanes; comprising horizontal stabilizer engaging bar means, hinged joint means, ground securing plate means.

1 Claim, 1 Drawing Sheet

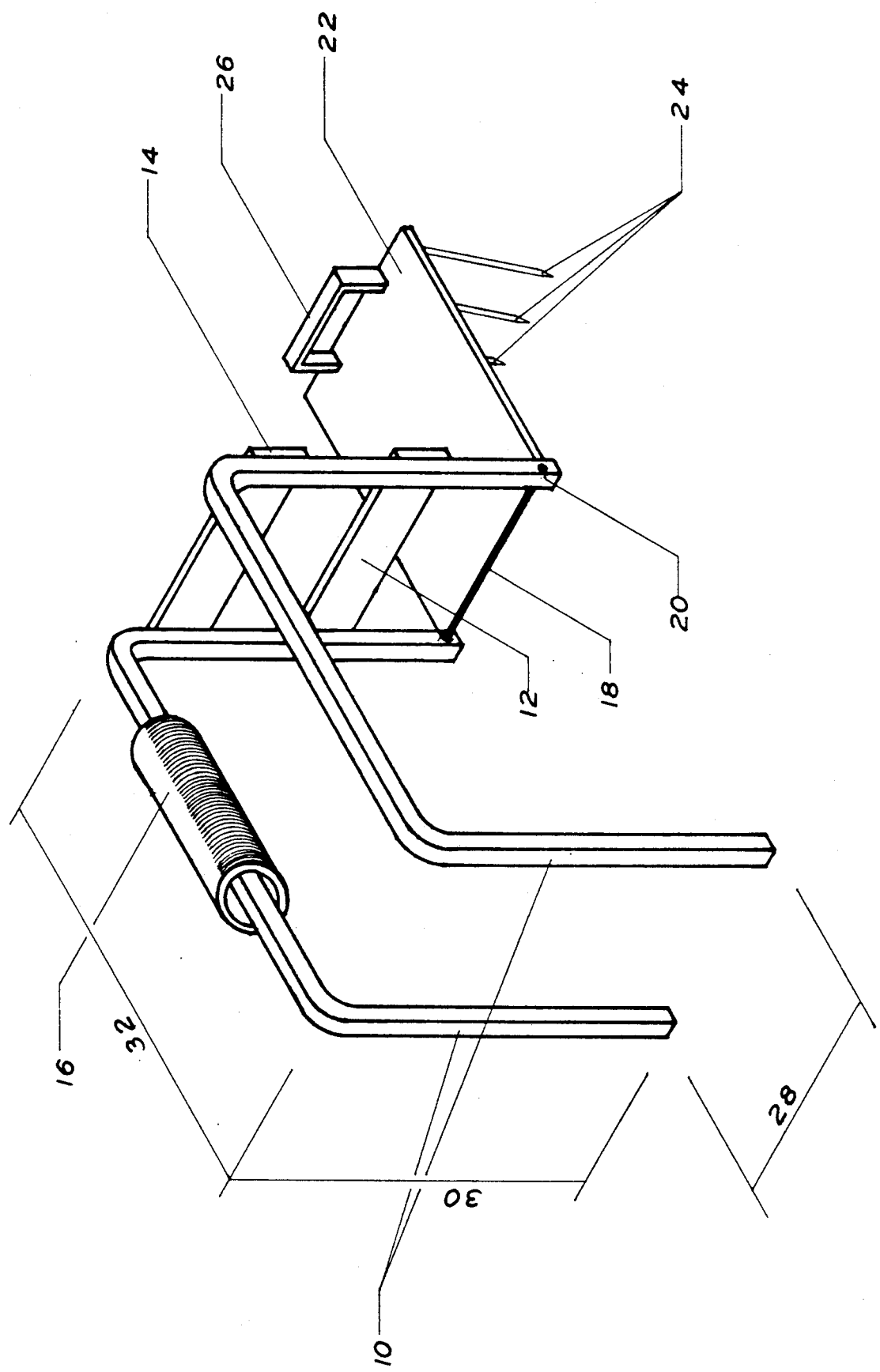

GROUND RETAINING DEVICE

BACKGROUND OF THE INVENTION

Flying pilotless, radio-controlled, miniature model airplanes is a very popular hobby in the United States and foreign countries. In the United States along, there are over 100,000 members that belong to the "Academy of Model Aeronautics" (AMA), a national organization with headquarters at Reston, Va. Safety is paramount in the operation of full sized airplanes as well as pilotless, radio controlled, miniature model airplanes, however, personnel injury and property damage can occur at any time a pilot (including a remote control pilot) is careless or inadvertently loses control of an airplane. Generally, Model Aeronautics is a safe hobby, however, there are certain safety hazards that are inherent, such as cranking and adjusting model airplane engines without assistance. Many times there is no one available to assist the pilot by holding the model airplane securely on the ground while the engine is being cracked. The safety hazards created when cranking a model engine without assistance can best be understood by explaining the procedures to start a model airplane engine; first the remote control transmitter and receiver in the model airplane is turned on then the engine throttle is adjusted to an idle setting (or should be). The glow plug battery is connected to the glow plug, then the pilot must physically hold the aircraft with one hand, reach over the motor/propeller with the other arm, pick up an electric starter, press the starter against the nose cone of the propeller and rotate the engine until the motor starts. When the engine starts, the pilot is holding the model airplane with only one hand until the starter can be secured and the glow plug battery connections removed. If the throttle was inadvertently left open, the pilot would be in a very awkward and dangerous position, trying to hold the airplane with one hand while the engine is rotating up to 17,000 rpm producing maximum torque. Severe injuries have occurred in the past due to the pilot not being able to securely hold the model airplane after starting the engine. My invention will fill the need for an effective ground retaining device for pilotless, radio controlled, miniature model airplanes and will help reduce accidents for all those who enjoy this hobby.

PRIOR ART

I have searched all the inventions in my class and found no prior art on "aircraft retaining devices" for pilotless, radio controlled, miniature model airplanes. However, there are eleven (11) related U.S. Patents for full size aircraft, missiles, or air cushion vehicles. These related patents are listed separately.

OBJECT OF THE INVENTION

It is, therefore, one of the objects of the invention to provide a ground retaining device to securely hold pilotless, miniature radio controlled airplanes on the ground when cranking and running the engine.

Another object is to reduce the "safety hazard" associated when cranking and running a pilotless, miniature, radio-controlled model airplane without assistance.

An additional object is to provide a ground retaining device that will not damage the model airplane.

Another object is to provide a ground retaining device that is lite in weight, small and easy to transport.

A further object is to provide a ground retaining device that can be temporarily installed in the earth or permanently installed in asphalt or concrete.

BRIEF DESCRIPTION OF THE FIGURES OF THE DRAWING

FIG. 1 is a perspective view of a retaining device embodying the present invention.

DETAIL DESCRIPTION OF THE INVENTION

Referring to the drawing, it is seen that the device of the present invention comprises horizontal stabilizer engaging bar means (10), (12), (14), and (16); hinge joint means (18) and (20); ground securing plate means (22), (24) and (26).

Said engaging bar (10) may be formed of solid or hollow metal stock having three sections, each said section perpendicular to adjoining section, forming a squared U of sufficient height (30) and length (32) to compass about and engage horizontal stabilizers or main wing of pilotless, miniature, radio controlled model airplanes, braces (12) and (14) may be formed of flatbar metal designed to connect two identical said bars (10) in parallel having adequate distance between the said bars (28) to facilitate the positioning of the said engaging bars (10) over the rudder and fuselage of said model airplanes. Padding material (16) may be formed of a foam pipe insulating substance or other foam material affixed to the innermost surface of said engaging bars (10) and said braces (12) and (14) to prevent damage to said model airplanes.

Hinge joint pin (18) may be formed of round metal stock affixed to one extremity of said securing plate (22), said pin extremities inserted in and extending through drilled holes (20) in said engaging bars (10), said braces (12) and (14) hold said engaging bars (10) adjacent to said pin (18).

Said securing plate (22) may be formed of flatbar metal, wherein said hinge joint pin (18) is affixed to one extremity, a pull handle (26) and a plurality of ground spikes sharpened on one end (24) attached at the opposite extremity, said pull handle (26) may be formed of flatbar metal and attached to the topside of said securing plate (22) to allow easy removal of said securing plate (22) from the earth. A plurality of said ground spikes (24) may be formed of round metal stock and affixed to the bottomside of said securing plate (22) at an approximate 70 degree angle relative to said securing plate; whereas operation of said retaining device is very simple and easy, a plurality of said ground spikes (24) are completely inserted into the earth to a point where said securing plate (22) is parallel and adjacent to the earth, the said engaging bar means (10) (12) (14) and (16) is pivoted backward to a position where said braces (12) and (14) are adjacent to the topside of said securing plate (22). This configuration is henceforth called the "standby" position. A said model airplane is positioned in close proximity and forward of said engaging bar means. Pivoting the said engaging bar means forward would encompass and engage the horizontal stabilizer or main wing of said model airplane holding the said model airplane securely on the ground until the pilot pivots the said engaging bar means back to the standby position. The said retaining device can easily be disengaged from the earth by applying an upward force on the said pull handle. During transportation, the pointed ends of said ground spikes (24) are secured adjacent to said brace (12) with rubber bands placed around said engaging bars (10) and 115 securing plate (22).

The embodiments of the invention in which particular property or privilege is claimed are defined as follows:

1. A ground retaining device for pilotless, miniature, radio controlled, model airplanes; said device comprising horizontal stabilizer engaging bar means, hinge joint means, ground securing plate means; whereas each said engaging bar means having three sections, each said section perpendicular to adjoining section forming a squared U of sufficient height and length to encompass and engage horizontal stabilizers or main wing of said model airplanes, two braces connect two identical said engaging bar means in parallel having adequate distance between the two said engaging bar means to facilitate the positioning of the said engaging bar means over the rudder and fuselage of said model airplanes, a padding material is affixed to the innermost surfaces of said engaging bar means and said braces; whereas said hinge joint means comprising hinge joint pin affixed to one extremity of said ground securing plate means, said pin extremities inserted in and extending through drilled holes in said engaging bar means, said engaging bar means are held securely adjacent to said pins by said braces; whereas said ground securing plate means comprising a rectangular plate having said hinge joint means affixed at one extremity, a pull handle and plurality of pointed spikes positioned at the opposite extremity, said spikes positioned at a 70 degree angle relative to said ground securing plate and affixed to the bottomside of said ground securing plate, said pull handle is affixed to the topside of said ground securing plate opposite said spikes.

* * * * *